US009591018B1

(12) United States Patent
Zakian et al.

(10) Patent No.: US 9,591,018 B1
(45) Date of Patent: Mar. 7, 2017

(54) AGGREGATION OF NETWORK TRAFFIC SOURCE BEHAVIOR DATA ACROSS NETWORK-BASED ENDPOINTS

(71) Applicant: Amazon Technologies, Inc., Reno, NV (US)

(72) Inventors: Christopher Samuel Zakian, Seattle, WA (US); Patrick Devere Smith, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 50 days.

(21) Appl. No.: 14/549,432

(22) Filed: Nov. 20, 2014

(51) Int. Cl.
  *H04L 29/06* (2006.01)
  *G06F 17/30* (2006.01)
  *G06F 21/55* (2013.01)
  *G06F 9/455* (2006.01)
  *H04L 12/26* (2006.01)

(52) U.S. Cl.
  CPC ...... *H04L 63/1441* (2013.01); *G06F 9/45558* (2013.01); *G06F 21/552* (2013.01); *H04L 63/1408* (2013.01); *H04L 63/1416* (2013.01); *H04L 63/1425* (2013.01); *H04L 63/1458* (2013.01)

(58) Field of Classification Search
  CPC ............. H04L 63/1408; H04L 63/1416; H04L 63/1458; H04L 63/1425; H04L 63/1441; H04L 2463/141; H04L 43/022; H04L 43/026; H04L 12/585; H04L 2463/144; H04L 2463/146; H04L 43/062; G06F 21/552; G06F 9/45558
  See application file for complete search history.

(56) References Cited

U.S. PATENT DOCUMENTS

| | | | |
|---|---|---|---|
| 6,944,673 B2 | 9/2005 | Malan et al. | |
| 7,124,440 B2 * | 10/2006 | Poletto | H04L 12/2602 709/224 |
| 7,293,238 B1 * | 11/2007 | Brook | H04L 63/1416 709/224 |

(Continued)

OTHER PUBLICATIONS

Debar, Hervé, and Andreas Wespi. "Aggregation and correlation of intrusion-detection alerts." Recent Advances in Intrusion Detection. Springer Berlin Heidelberg, 2001.*

(Continued)

*Primary Examiner* — Michael Simitoski
(74) *Attorney, Agent, or Firm* — Robert C. Kowert; Meyertons, Hood, Kivlin, Kowert & Goetzel, P.C.

(57) ABSTRACT

Aggregation of network traffic source behavior data across network endpoints may be implemented. Indications of endpoint-specific network traffic directed to different network endpoints may be received. Aggregate traffic source behavior data may be generated across multiple aggregation levels. One or more traffic aggregation nodes may be implemented for each aggregation level to maintain different respective portions of the aggregate traffic source behavior data. Different granularity of the aggregate traffic source behavior data may be maintained at each of the aggregation levels. An indication of traffic source behavior for traffic sources may be provided such that responsive actions, such as traffic control actions, may be performed with regard to the traffic sources.

20 Claims, 9 Drawing Sheets

(56) References Cited

U.S. PATENT DOCUMENTS

| | | | | |
|---|---|---|---|---|
| 7,356,585 | B1* | 4/2008 | Brook | H04L 63/1416 709/224 |
| 7,779,465 | B2* | 8/2010 | Baker | G06F 21/554 726/22 |
| 7,937,480 | B2 | 5/2011 | Alperovitch et al. | |
| 8,015,604 | B1* | 9/2011 | Tidwell | H04L 41/046 709/224 |
| 8,151,341 | B1* | 4/2012 | Gudov | H04L 63/1408 726/13 |
| 8,214,497 | B2 | 7/2012 | Alperovitch et al. | |
| 8,321,938 | B2* | 11/2012 | Strayer | H04L 63/1408 726/1 |
| 8,353,031 | B1* | 1/2013 | Rajan | G06F 21/00 726/22 |
| 8,955,107 | B2* | 2/2015 | Eyada | H04L 63/0263 726/1 |
| 2001/0039579 | A1* | 11/2001 | Trcka | G06F 21/552 709/224 |
| 2002/0032880 | A1* | 3/2002 | Poletto | H04L 12/2602 714/4.1 |
| 2002/0035698 | A1 | 3/2002 | Malan et al. | |
| 2002/0178383 | A1* | 11/2002 | Hrabik | H04L 63/1433 726/4 |
| 2003/0226038 | A1* | 12/2003 | Raanan | G06F 21/604 726/1 |
| 2004/0123141 | A1* | 6/2004 | Yadav | H04L 63/1416 726/23 |
| 2005/0102429 | A1* | 5/2005 | Pinhas | H04L 67/1095 709/248 |
| 2006/0191008 | A1* | 8/2006 | Fernando | G06F 21/554 726/23 |
| 2006/0203739 | A1 | 9/2006 | Padmanabhan et al. | |
| 2008/0096526 | A1* | 4/2008 | Miettinen | G06F 21/552 455/411 |
| 2008/0141332 | A1* | 6/2008 | Treinen | H04L 63/1416 726/1 |
| 2008/0162499 | A1* | 7/2008 | Connor | G06F 8/20 |
| 2009/0125980 | A1 | 5/2009 | Alperovitch et al. | |
| 2010/0082513 | A1* | 4/2010 | Liu | H04L 63/1458 706/46 |
| 2010/0202299 | A1* | 8/2010 | Strayer | H04L 63/1408 370/252 |
| 2011/0113467 | A1* | 5/2011 | Agarwal | G06F 21/6281 726/1 |
| 2012/0215907 | A1* | 8/2012 | Chung | G06F 21/552 709/224 |
| 2012/0240182 | A1* | 9/2012 | Narayanaswamy | G06F 9/5077 726/1 |
| 2012/0304288 | A1 | 11/2012 | Wright et al. | |
| 2013/0018765 | A1* | 1/2013 | Fork | H04L 67/10 705/34 |
| 2014/0245443 | A1* | 8/2014 | Chakraborty | H04L 63/1425 726/23 |
| 2014/0317737 | A1* | 10/2014 | Shin | H04L 63/1408 726/23 |
| 2015/0207709 | A1* | 7/2015 | Hanckel | H04L 41/069 709/224 |
| 2015/0373040 | A1* | 12/2015 | Sander | H04L 63/1425 726/22 |
| 2015/0373043 | A1* | 12/2015 | Wang | H04L 63/1433 706/12 |
| 2016/0028752 | A1* | 1/2016 | Di Pietro | H04L 63/1416 726/23 |
| 2016/0028762 | A1* | 1/2016 | Di Pietro | H04L 63/1458 726/23 |
| 2016/0050132 | A1* | 2/2016 | Zhang | H04L 43/02 370/252 |

OTHER PUBLICATIONS

Li, Ji, Dah-Yoh Lim, and Karen R. Sollins. "Dependency-based Distributed Intrusion Detection." DETER. 2007.*

Münz, Gerhard, and Georg Carle. "Real-time analysis of flow data for network attack detection." Integrated Network Management, 2007. IM'07. 10th IFIP/IEEE International Symposium on. IEEE, 2007.*

Strayer, W. Timothy, et al. "Architecture for multi-stage network attack traceback." Local Computer Networks, 2005. 30th Anniversary. The IEEE Conference on. IEEE, 2005.*

\* cited by examiner

AGGREGATION OF NETWORK TRAFFIC SOURCE BEHAVIOR DATA ACROSS NETWORK-BASED ENDPOINTS

BACKGROUND

Virtualization technologies may be leveraged to create many different types of services or perform different functions for client systems or devices. For example, virtual machines may be used to implement a network-based service for external customers, such as an e-commerce platform. Virtual machines may also be used to implement a service or tool for internal customers, such as information technology (IT) service implemented as part of an internal network for a corporation. Network traffic may therefore be directed to these virtual machines in order to perform the various functions or tasks provided by the services or functions performed utilizing the virtual machines. Network traffic, however, may not always be sent for legitimate use of the virtual machines. Malicious or fraudulent network traffic may waste virtual machine resources for handling legitimate network traffic. Moreover, malicious or fraudulent network traffic that is successful in its objectives may comprise the service as well as client information. Such challenges are not limited to network traffic directed to virtual machines, but may generally all network-based resources that receive network traffic at some network endpoint.

Figure 1:
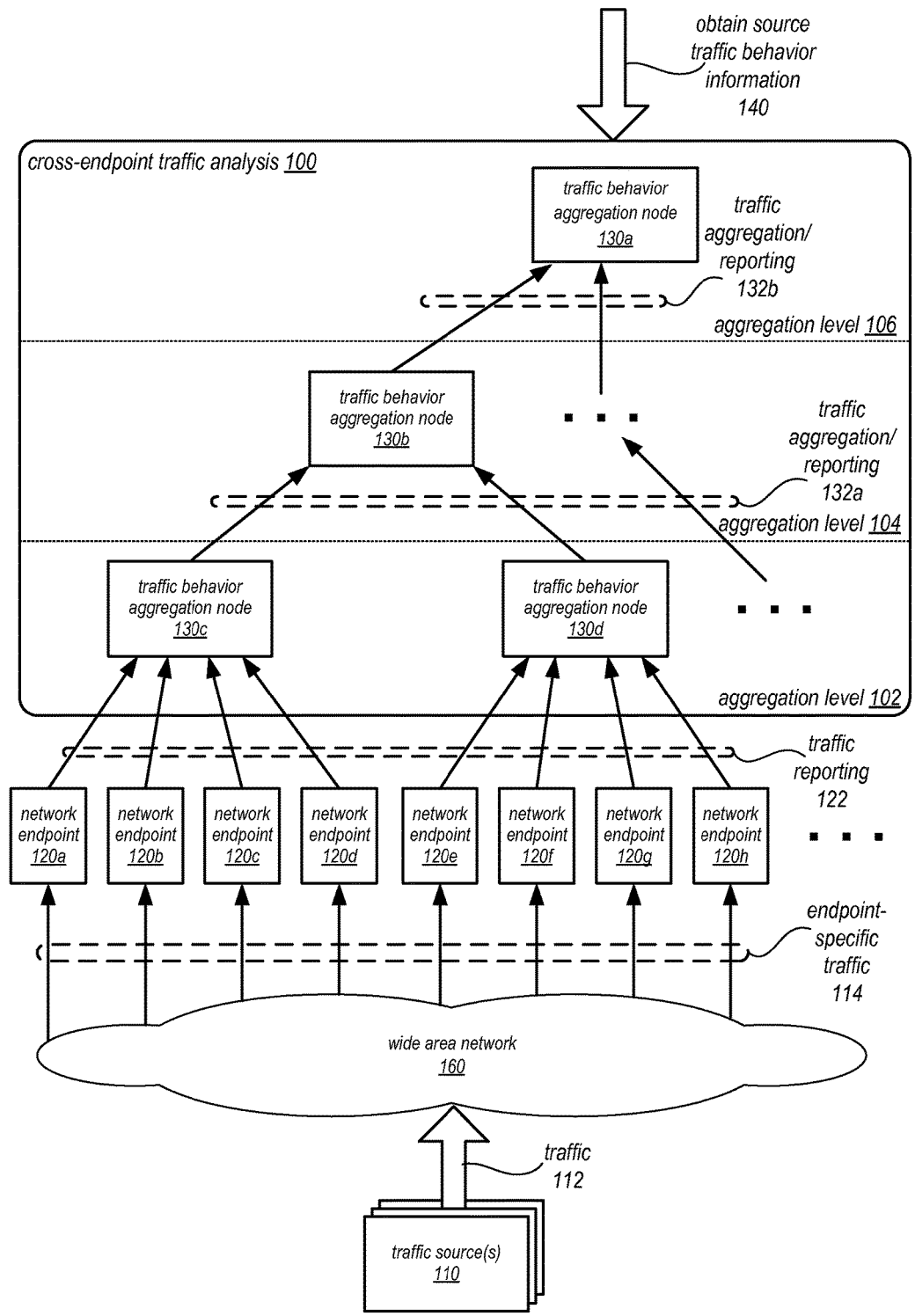
FIG. 1 is a logical diagram illustrating aggregation of network traffic source behavior data across network endpoints, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement aggregating network traffic source behavior data, according to some embodiments. Network-based resources, such as web-sites, services, or any other network accessible data and/or content may often be subject to unwanted or illegitimate traffic directed to the resource. For example, various automated requestors, such as robots (also referred to as "bots") may send bad, malformed, or high volumes of requests to network endpoints for the network-based resources. In some cases, this unwanted traffic may be simply time consuming or wasteful to process. However, in some instances, the network traffic may be directed to a network-based resource as part of some network attack (e.g., a denial of service attack), computer viral activity, or attempts to fraudulently access the network-based resource (e.g., attempts to hack a customer account login or password). Oftentimes, knowledge of the sources of these attacks is often limited to the entity or operator of the network-based resource receiving the illegitimate traffic, only allowing reactive actions to be taken with regard to the illegitimate traffic. Moreover, sophisticated illegitimate traffic may target multiple network-based resources in such a way as to elude detection at any one network-based resource. Aggregation of network traffic source behavior data across network endpoints may be implemented to allow for a response to unwanted traffic.

Aggregation of network traffic source behavior data across network endpoints may be implemented for a variety of different types of network-based resources reached via the network endpoints. For example, in various embodiments a provider network may supply clients, operators, or other customers with access to and/or control of one or more computing resources which may operate as network-based resources exposed to potential unwanted or illegitimate network traffic. These resources may include various types of computing systems or devices configured for communication over a network.

In some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource) as part of a virtual computing service (among other network-based services. Clients of the provider network may reserve (i.e., purchase or buy) one or more compute resources (such as compute instances) to perform various functions, services, techniques, and/or applications. As part of performing these functions, services, techniques, and/or applications, network traffic may be received for the different compute resources from traffic sources external to the provider network. For example, a set of compute resources, such as multiple servers providing a payment service for an e-commerce website may receive network traffic to facilitate payments for items purchased at the e-commerce website.

Provider clients who utilize computing resources may take advantage of the flexibility with which new resources can be acquired. Virtual compute resources, for example, can be quickly scaled to meet demand, such as for a provider client implementing a fast-growing web service. However, processing unwanted or illegitimate network traffic at the virtual compute resources may increase the number of resources required to provide the desired functionality. Such unwanted utilization of resources may be wasteful for both provider clients and the provider network itself, which may offer the wasted resources to other provider clients. Implementing aggregation of network traffic source behavior data across network endpoints may allow responsive actions, such as various traffic control actions like dropping, blocking, or redirecting network traffic, to be performed proactively (without receiving network traffic from an identified traffic source) based on traffic source behavior information collected from network traffic directed to other computing resources in the provider network. In this way, provider clients could reduce the number of computing resources to handle network traffic based on the reduced amount of illegitimate traffic received at the computing resources.

The larger the pool of aggregate network traffic source behavior data, the earlier a problematic traffic source may be detected, and dealt with. Thus, similar benefits may be provided when implementing these aggregation techniques for other network-based resources in addition to or instead of the example computing resources described above.

FIG. 1 is a logical diagram illustrating aggregation of network traffic source behavior data across network endpoints, according to some embodiments. Network endpoints 120, such as network endpoints 120a, 120b, 120c, 120d, 120e, 120f, 120g, and 120h, may be implemented to receive network traffic from multiple different traffic sources 110. Network endpoints 120 may, in various embodiments, be various types of network addresses, domains, domain names, ports, subnets, or any other particular information to which traffic source(s) 110 may direct network traffic. Traffic source(s) 110 may be various clients, servers, services, networks, or other originators (or apparent originators) of network traffic that is sent via wide area network 160 (e.g., the Internet) to specific network endpoints 120 as endpoint-specific traffic.

As illustrated in FIG. 1, traffic reporting 122 for the endpoint-specific traffic 114 may be performed to provide indications of the network traffic to the network endpoints 120 into cross-endpoint traffic analysis system/service 100. In at least some embodiments, cross-endpoint traffic analysis 100 may implement multiple different aggregation levels, such as levels 102, 104, and 106. Each aggregation level may provide an aggregate view of traffic 114 directed to network endpoints 120 according to a particular granularity for the aggregation level, as discussed below with regard to FIG. 5. For instance, aggregation level 102 may maintain endpoint-specific granularity, such as that the particular endpoint-specific traffic 114 directed to a network-endpoint from particular traffic source(s) 110 may be visible (and thus actionable for performing responsive actions against those traffic source(s) 110). Different granularities of the aggregate traffic behavior data may allow for responsive actions to be tuned or configured specific to the network-based resource behind the network endpoint 120.

In at least some embodiments, cross-endpoint traffic analysis 100 may implement multiple traffic behavior aggregation nodes 130, such as described in detail below with regard to FIG. 4. Traffic behavior aggregation nodes 130 may maintain a portion of the aggregate traffic source behavior data. Traffic behavior aggregation nodes 130 may also belong to a particular aggregation level. For instance, traffic behavior aggregation nodes 130c and 130d are illustrated as belonging to aggregation level 102, while traffic behavior aggregation node 103b is illustrated as belonging to aggregation level 104 and traffic behavior aggregation node 130a is illustrated as belonging to aggregation level 106. These nodes may act, in various embodiments, as clusters, either within a particular aggregation level or within the cross-endpoint traffic analysis service 100, in some embodiments. For instance, as illustrated in FIG. 1, communication between nodes may occur (traffic aggregation and reporting 132a and 132b).

Traffic aggregation and reporting 132 may generate the different respective granularities maintained in the different aggregation levels at the different traffic behavior aggregation nodes, in various embodiments. As discussed below with regard to FIG. 7, traffic behavior aggregation nodes may receive traffic behavior data, and generate an aggregate version of the data according to the granularity for a next aggregation level before reporting the traffic source behavior data. For example, at aggregation level 102, traffic sources 110 may be identified that exceed some number of requests (e.g., 10 requests) to any network endpoint in a particular time period (e.g., 1 second) or timeslice. For generating an aggregated version of the data according to a different granularity, the traffic sources 110 may be identified that exceed some greater number of requests (e.g., 100 requests) to any network endpoint 120 in the particular time period. Providing different levels of granularity may allow for the different aggregation levels to filter according to different events, data, or behavior of significance. For instance, aggregate traffic source behavior data maintained in aggregation level 106, as a higher aggregation level, may be more coarse, identifying those traffic source(s) 110 with traffic behavior that is particular significant (e.g., high likelihood of illegitimate traffic).

As illustrated in FIG. 1, source traffic behavior information 140 may be obtained, and may, in various embodiments, be used to determine whether to perform responsive actions, such as various traffic control actions for traffic directed to network endpoints 120. For example, indications of traffic behavior for particular traffic source(s) 110 may be obtained and/or provided to traffic enforcement agents, as discussed below with regard to FIG. 2, or other mechanisms to implement responsive actions based on the information. In this way, network endpoint 120h may, for example, block traffic from a particular traffic source 110, based on the traffic reporting 122 for network-endpoint 120a, which may have received network traffic from the particular traffic source(s) 110—even though the particular traffic source(s) 110 did not send network traffic to network endpoint 120h.

Please note that previous descriptions are not intended to be limiting, but are merely provided as an example of network endpoints, aggregation levels, and/or traffic behavior aggregation nodes. Various other components may interact with or assist in aggregating network traffic source behavior data across network endpoints.

This specification next includes a general description of cross-endpoint traffic analysis service, which may implement aggregating network traffic source behavior data across network endpoints. Then various examples of the cross-endpoint traffic analysis service are discussed, including different components/modules, or arrangements of components/module that may be employed as part of implementing the service. A provider network which may implement the service is also discussed. A number of different methods and techniques to implement aggregating network traffic source behavior data across network endpoints are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
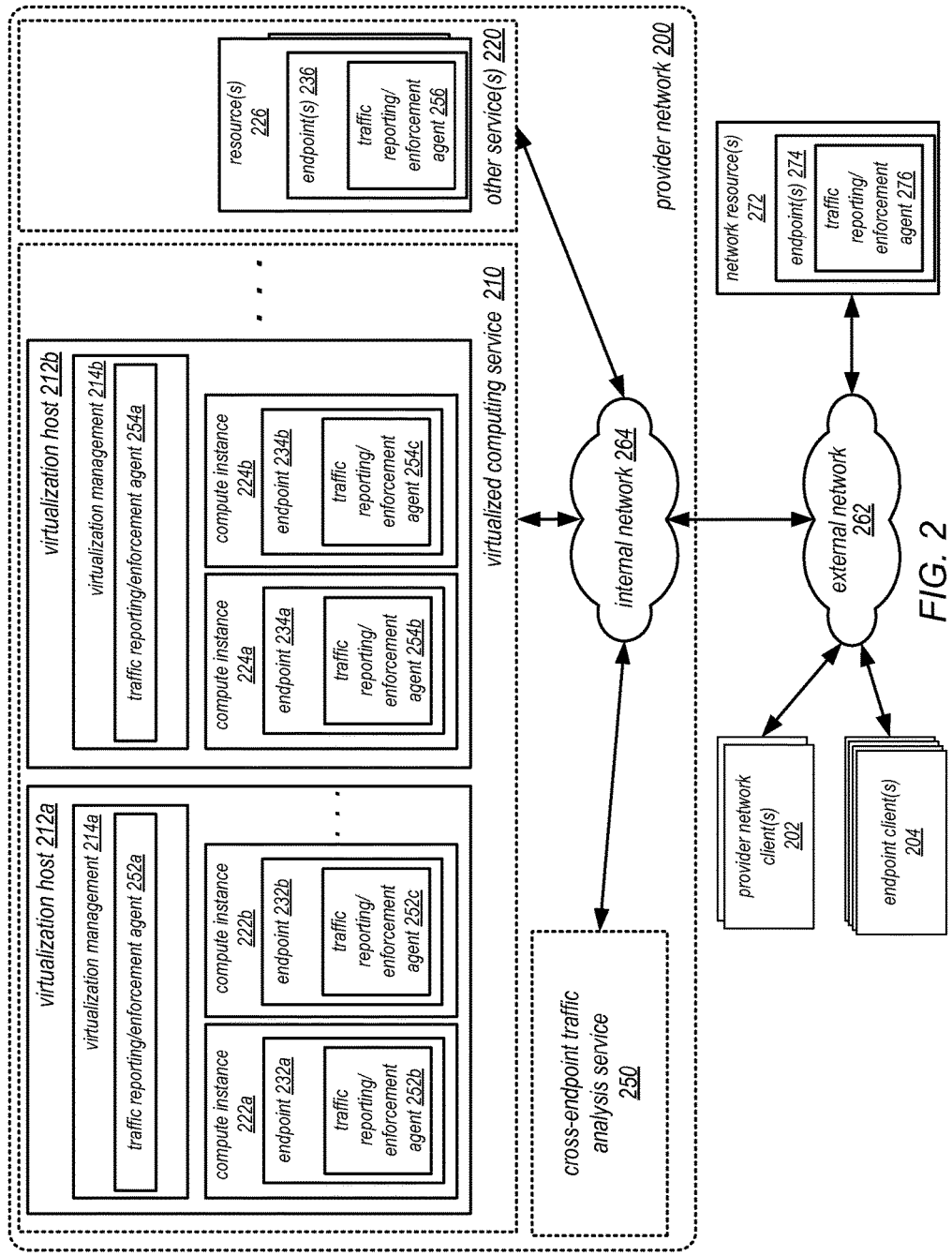
FIG. 2 is a block diagram illustrating a provider network that implements a cross-endpoint network analysis service that provides aggregation of network traffic source behavior data across network endpoints, according to some embodiments.

FIG. 2 is a block diagram illustrating a provider network that implements a cross-endpoint network analysis service that provides aggregation of network traffic source behavior data across network endpoints, according to some embodiments. Provider network 200 may be set up by an entity such as a company or a public sector organization to provide one or more services (such as various types of cloud-based computing or storage) accessible via the Internet and/or other networks to provider network clients 202. Provider network clients 202 may in turn utilize the services to provide different resources, such as compute instances 22a, 222b, 224a, and 224b, which may be accessible to endpoint client(s) 204. Provider network 200 may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may provide a virtualized computing service 210 that offers computing resources. These computing resources may in some embodiments be offered to clients in units called "instances," such as virtual or physical compute instances or storage instances. Provider network 200 may also implement various other service(s) 220, which may provide various different storage, analytic, computing, processing, or other resources. Provider network 200 may also implement cross-endpoint traffic analysis service 250.

A virtual compute instance (e.g., 222a, 222b, 224a, or 224b) may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of provider network 200 in different embodiments, including general purpose or special purpose computer servers, storage devices, network devices and the like. In some embodiments endpoint clients 204 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client 202 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, compute instances may be a network-based resource behind an endpoint for receiving network traffic. For instance endpoint 232a may be a domain name or network address for compute instance 222a, which endpoint client(s) 204 may direct network traffic to. Similarly, endpoints 232b, 234a, and 234b may serve as targets for network traffic directed to compute instance(s) 222b, 224a, and 224b respectively. Please note, that other service(s) 220 may also implement network-based resource(s) 226 (e.g., database systems/platforms, workflow engines or data storage), which may be targeted for network traffic via endpoint(s) 236. In at least some embodiments, external network resources 272 (e.g., web sites, services, etc.) may report network traffic to respective endpoint(s) 274 and/or consume aggregated network traffic source behavior data for enforcement at traffic reporting/enforcement agents 276.

In at least some embodiments, the different network-based resources may implement a traffic reporting/enforcement agent to report endpoint specific traffic to cross-endpoint traffic analysis service 250 and receive traffic source behavior data from cross-endpoint traffic analysis service 250 and perform responsive actions, such as enforcement or traffic controls actions. As illustrated in FIG. 2, traffic reporting enforcement agents 252b, 252c 254b, 254c, and 256 may be implemented at the network-based resources. As such, these agents may be able to report encrypted or otherwise unobtainable data (from provider network 200's point of view), in order to provide a richer set of data for the traffic source behavior data that is reported (with various provider network client 202 permissions and controls set up to ensure that only customer approved data is reported).

Figure 9:
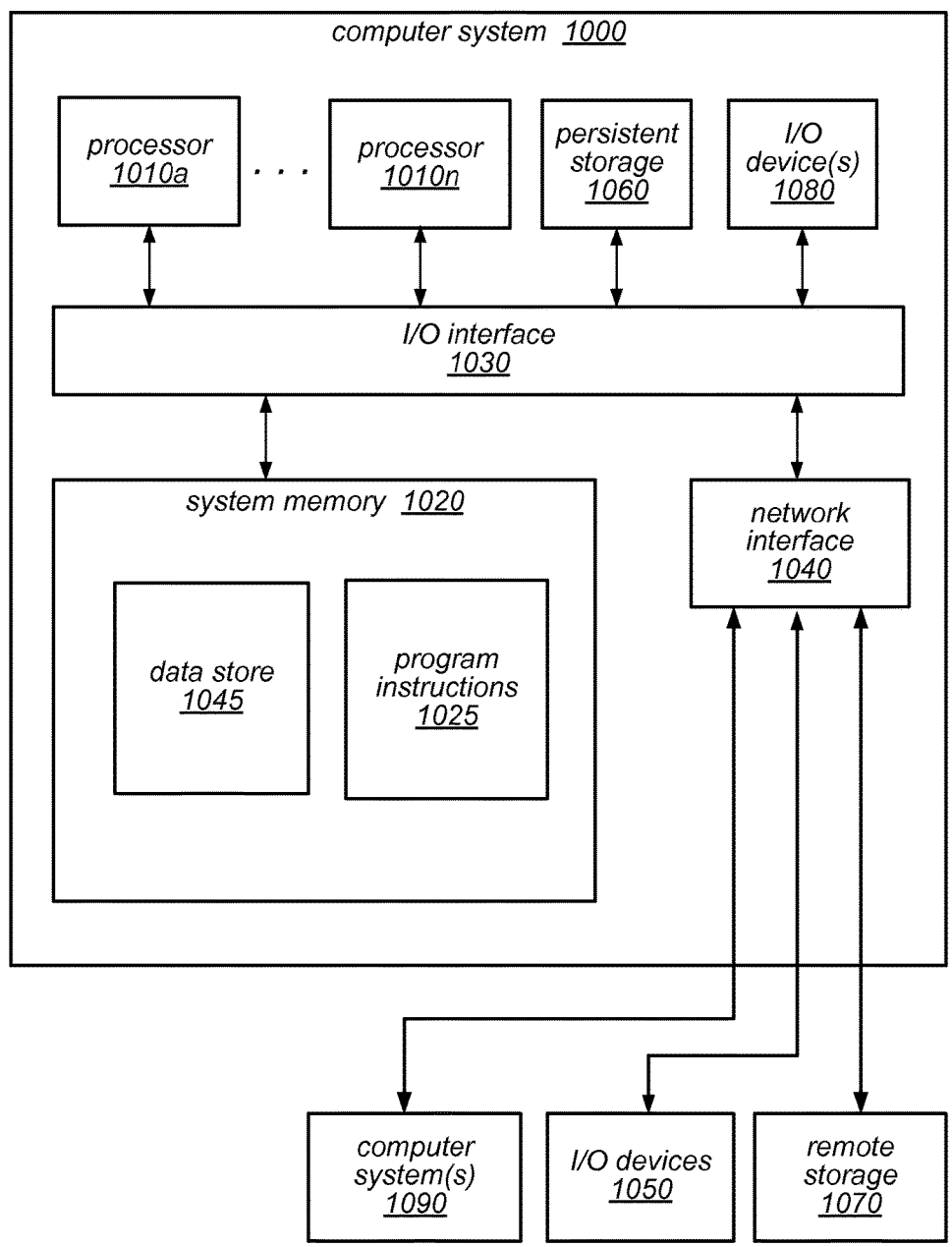
FIG. 9 is a block diagram illustrating an example computing system, according to some embodiments.

As illustrated in FIG. 2, virtualization hosts, such as virtualization hosts 212a and 212b, may implement and/or manage multiple compute instances 222 and 224 respectively, in some embodiments, and may be one or more computing devices, such as computing system 1000 described below with regard to FIG. 9. A virtualization host may include a virtualization management module, such as virtualization management modules 214a and 214b, capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the network provider, including handling the network traffic directed to or from the compute instances. For instance, virtualization management modules may implement traffic reporting/enforcement agents, such as agents 252a and 254a. Traffic reporting/enforcement agents implemented at virtualization management modules may allow provider network 200, computing service 210, and/or cross-endpoint traffic analysis service 250 to automatically collect traffic source behavior data and perform responsive actions without any action or implementation at the network-based resource hosted at the virtualization host.

Provider network 200 may implement cross-endpoint traffic analysis service 250, which is discussed in further detail below with regard to FIG. 3.

Provider network 200 may implement internal network 264. Internal network 264 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, cross-endpoint traffic analysis service 250, other service(s) 220, as well as external networks 262 (e.g., the Internet). In some embodiments, provider network 200 may employ an Internet Protocol (IP) tunneling technology to provide an overlay network via which encapsulated packets may be passed through internal network 264 using tunnels. The IP tunneling technology may provide a mapping and encapsulating system for creating an overlay network on network 264 and may provide a separate namespace for the overlay layer and the internal network 110 layer. Packets in the overlay layer may be checked against a mapping directory (e.g., provided by mapping service—not illustrated) to determine what their tunnel target should be. The IP tunneling technology provides a virtual network topology; the interfaces that are presented to clients 202 and 204 may be attached to the overlay network so that when a client provides an IP address that they want to send packets to, the IP address is run in virtual space by communicating with a mapping service that knows where the IP overlay addresses are. In some embodiments, various techniques to report traffic source behavior and perform responsive actions, such as discussed above with regard to traffic reporting/enforcement agents may be implemented as part of internal network 264.

Provider network clients 202 may encompass any type of client configurable to submit requests to network provider 200. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance in a manner that is transparent to applications implement on the client 202 utilizing computational resources provided by the compute instance. Endpoint client(s) 204 may be similarly implemented, as discussed above with regard to provider network client(s) 202 in order to direct network traffic to various network endpoints in provider network 200.

Clients 202 and 204 may convey network-based services requests to provider network 200 via external network 262. In various embodiments, external network 262 may encompass any suitable combination of networking hardware and protocols necessary to establish network-based communications between clients and provider network 200. For example, a network 262 may generally encompass the various telecommunications networks and service providers that collectively implement the Internet. A network 262 may also include private networks such as local area networks (LANs) or wide area networks (WANs) as well as public or private wireless networks. For example, both a given provider client 202 and provider network 200 may be respectively provisioned within enterprises having their own internal networks. In such an embodiment, a network 262 may include the hardware (e.g., modems, routers, switches, load balancers, proxy servers, etc.) and software (e.g., protocol stacks, accounting software, firewall/security software, etc.) necessary to establish a networking link between the given provider client 202 and the Internet as well as between the Internet and provider network 200. It is noted that in some embodiments, clients 202 and 204 may communicate with provider network 200 using a private network rather than the public Internet.

Figure 3:
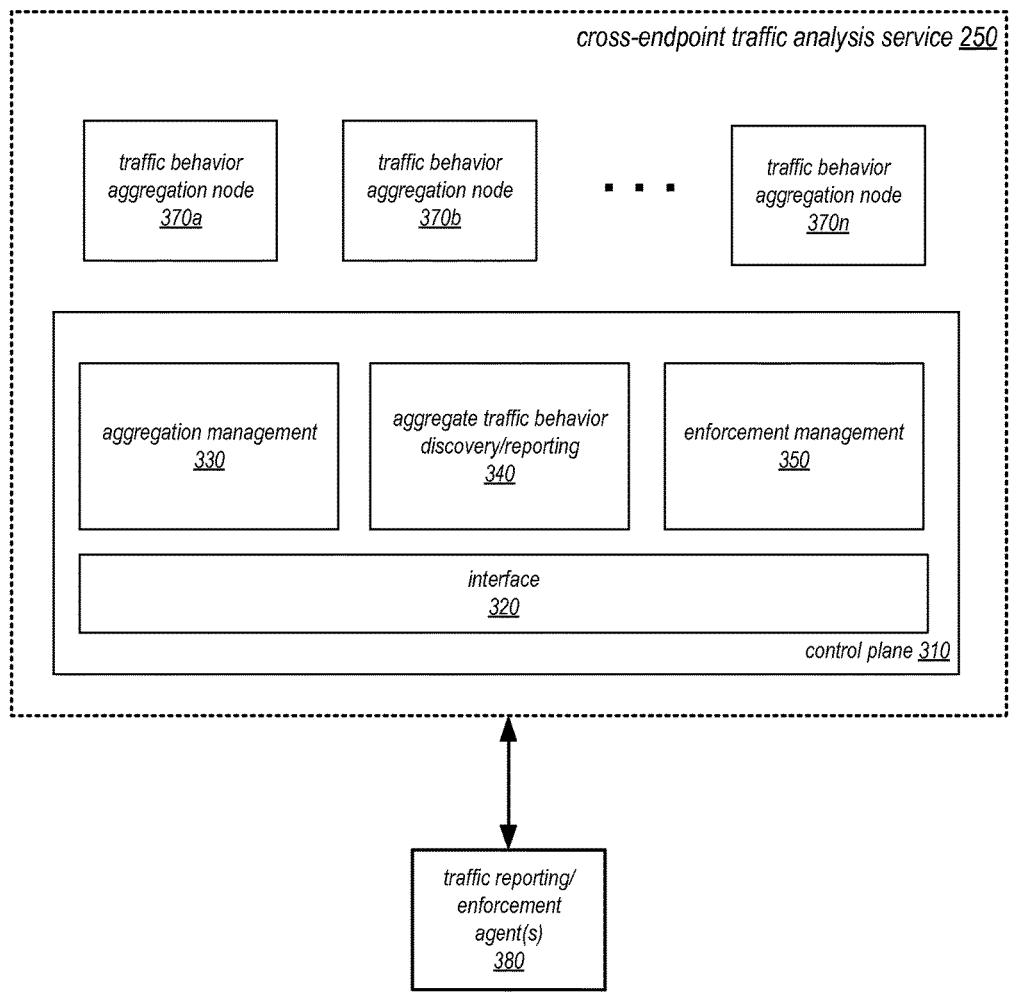
FIG. 3 is a block diagram illustrating various components of a cross-endpoint network analysis service that provides aggregation of network traffic source behavior data across network endpoints, according to some embodiments.

FIG. 3 is a block diagram illustrating various components of a cross-endpoint network analysis service that provides aggregation of network traffic source behavior data across network endpoints, according to some embodiments. Cross-endpoint traffic analysis service may be implemented as part of provider network 200, as illustrated above in FIG. 2, or may be implemented as a standalone service, in some embodiments. Cross-endpoint traffic analysis service 250 may interact with traffic reporting enforcement agent(s) 380 in various embodiments, to collect network traffic behavior data for different traffic sources directed to network endpoints and provide indications of traffic behavior for traffic sources to traffic/reporting enforcement agent(s) 380 in order to perform responsive actions.

In at least some embodiments, cross-endpoint traffic analysis service 250 may implement a control plane 310. Various different computing systems, servers, and/or nodes, such as computing system 1000 described below with regard to FIG. 9 may be implemented, in various embodiments. Control plane 310 may perform various management and operational functions to implement aggregating network traffic source behavior data, in various embodiments. For example, control plane 310 may implement an interface 320 for cross-endpoint traffic analysis service 250. Interface 320 may provide a programmatic and/or graphical interface which may be utilized to perform various actions. For example, additional network endpoints may be added for aggregation or requests/indications of various traffic behavior for resources may be provided. In at least some embodiments, a graphical user interface (GUI) may be implemented that allows clients of a provider network (e.g., clients 202 in FIG. 2), to select, modify, enable, disable, and/or otherwise configure traffic control policies for different network endpoints (e.g., implemented at virtual compute instances).

In at least some embodiments, control plane 310 may implement aggregation management 330. Aggregation management 330 may create, provision, initiate, organize, and/or otherwise manage the operation of traffic behavior aggregation nodes 370, in various embodiments. For example, aggregation management module 330 may determine the number of traffic behavior aggregation nodes 370 to assign to each aggregation level, tracking the storage space available for each aggregation level. If insufficient storage space remains for an aggregation level, then aggregation management 330 may provisions new traffic behavior aggregation nodes 370 to assign to the aggregation level in need. In some embodiments, aggregation management 330 may determine the number of aggregation levels. Such changes to the organization or assignments of traffic behavior aggregation node may also introduce changes to the aggregation levels. For example, if insufficient storage space remains at a top or highest aggregation level, then an aggregation level may be implemented, and the aggregate traffic source behavior data may be redistributed across the same and/or different traffic behavior aggregation nodes according to a distribution schema (e.g., a hash distribution schema). Aggregation management module 330 may determine the distribution schema for aggregation traffic source data among the traffic behavior aggregation nodes 370 for each aggregation level, in various embodiments.

Aggregation management 330 may determine the network endpoints allowed or authorized to report indications of network traffic, in various embodiments. For example, aggregation management 330 may coordinate/manage the receipt of network traffic indications for network-endpoints implemented for network-based resources external to a provider network (e.g., network resources 272 in FIG. 2), in some embodiments. Aggregation management 330 may also manage the addition of new network endpoints reporting indications of network traffic for new resources internal to a provider network.

Aggregation management 330 may also determine the granularity of data specified for each aggregation level. For example, aggregation management module 330 may implement one or more aggregation policies for each aggregation level. An aggregation policy may describe the traffic behavior of traffic sources that should be reported in an aggregated version of the data. For example, the data may include various information about the traffic source (e.g., network address, user agent, and/or other network protocol header information, such as Hypertext Transfer Protocol or Transmission Control Protocol header information) may be described as predicates, conditions, or other criteria in aggregation policies that determine when traffic source behavior is to be aggregated to a higher aggregation level. In at least some embodiments, various commands/requests may be received at interface 320 to modify the aggregation policies for one or more of the aggregation levels.

In at least some embodiments, control plane 310 may implement aggregate traffic behavior discovery and reporting 340. Aggregate traffic behavior discovery and reporting module 340 may be configured to provide indications of network behavior to traffic reporting and enforcement agent(s). In at least some embodiments, traffic reporting/enforcement agent(s) 380 may send requests via interface 320 for specific information, such as traffic behavior data for a specific network endpoint to aggregate traffic behavior discovery/reporting 340. Aggregate traffic behavior discovery/reporting 340 may perform various techniques, such as those discussed below with regard to FIG. 8, to retrieve the requested traffic behavior data from the appropriate traffic behavior aggregation node 370. Aggregate traffic behavior discovery/reporting 340 may publish indications of traffic behavior data, such as a black-list, white-list, or other indications of traffic source behavior, to various storage locations, communication platforms (e.g., a messaging service implemented as part of a provider network), or any other method of communication that may allow traffic reporting enforcement agent(s) 380 to consume the indications of traffic behavior data for traffic sources. In at least some embodiments, the indications of traffic source behavior data may be provided to clients implementing network-based resources behind network endpoints that are external to a provider network (e.g., externally hosted web sites). The indications may include various kinds or types of information describing a traffic source (e.g., user agent, network address) and/or behavior (e.g., number of requests per timeslice, number of access attempts, password reset, etc.). In at least some embodiments, the indications may be coded, rated, or otherwise identified with different confidence levels (e.g., 30% confident illegitimate traffic, 100% confident illegitimate traffic, etc.).

In at least some embodiments, control plane 310 may manage the enforcement of various traffic control policies or other responsive reactions to be performed with regard to traffic sources based on traffic behavior of the traffic sources. For example, clients of a provider network (e.g., provider network 200) that implement network-based resources behind the network endpoints may request the implementation of various traffic control policies or an enforcement mechanism to perform responsive actions for a network endpoint. For example, enforcement management may download, install, register, and/or otherwise provide a traffic reporting enforcement agent 380 onto a host of a network-based resource, and initiate traffic control policies to be enforced based on the violation of the traffic control policies (or satisfaction of control policy criteria). Updates or notifications of traffic source behavior may be pushed out to traffic reporting enforcement agent(s) 380, or may be placed in a location that the indications may be obtained (e.g., a storage service, database, or other accessible location). In at least some embodiments, enforcement management 350 may receive requests to initiate and/or configure traffic controls based on traffic behavior of traffic sources via a GUI implemented at interface 320.

Figure 4:
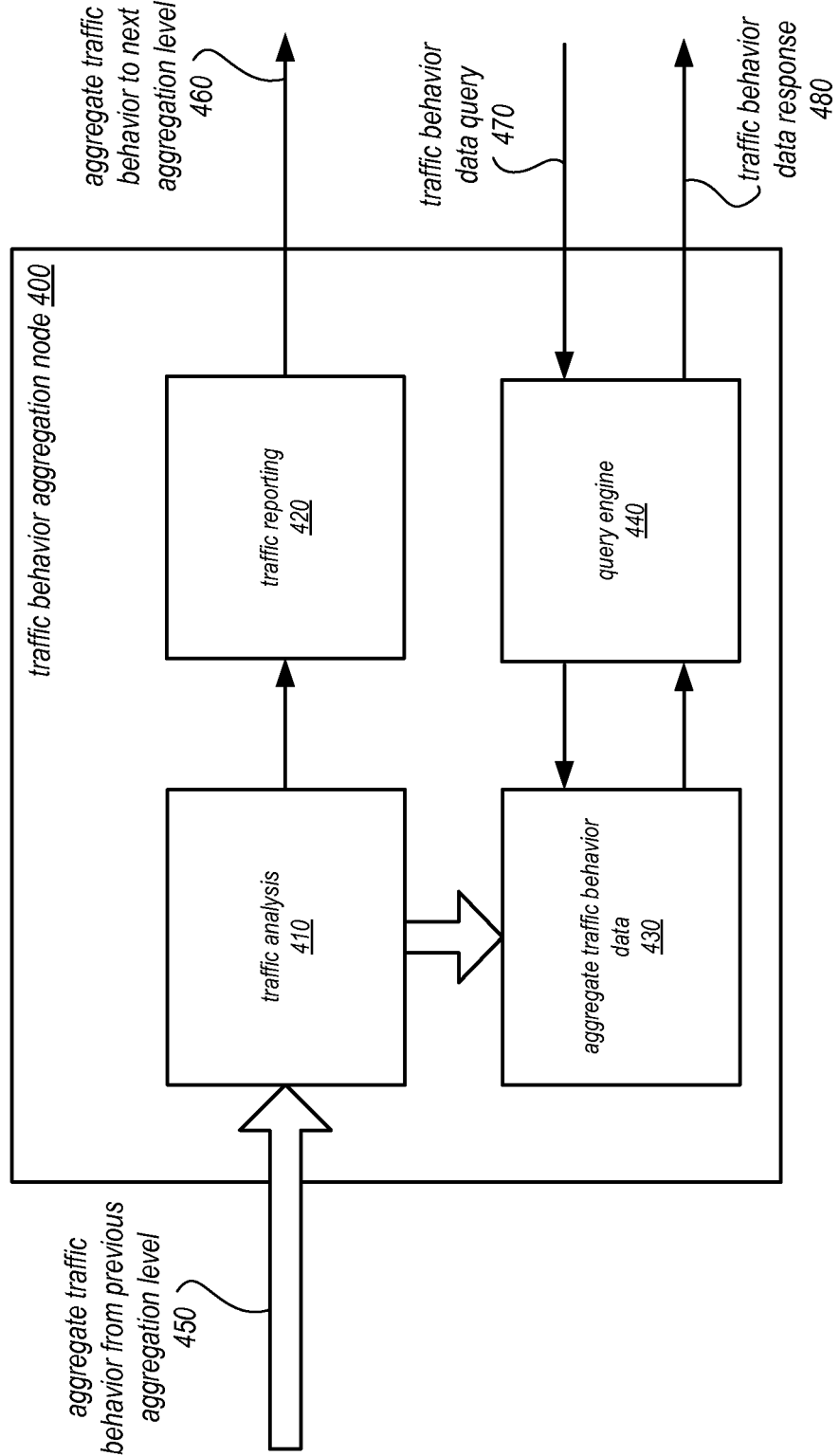
FIG. 4 is a block diagram illustrating an example traffic behavior aggregation node of a cross-endpoint network analysis service, according to some embodiments.

FIG. 4 is a block diagram illustrating an example traffic behavior aggregation node of a cross-endpoint network analysis service, according to some embodiments. Traffic behavior aggregation node 400 maintain a portion of aggregate traffic behavior in persistent storage for update and subsequent access based on updates to traffic behavior received from other traffic behavior aggregation nodes. As discussed below with regard to FIG. 5 (and above with regard to FIG. 1), traffic behavior aggregation node 400 may be assigned to an aggregation level, in various embodiments. As such aggregate traffic behavior from a previous (e.g., lower aggregation level) 450 may be provided to the traffic behavior aggregation node 400. In various embodiments, the aggregate traffic behavior data from previous aggregation levels may be provided as part of a gossip protocol among the nodes of the cross-endpoint traffic analysis service. The aggregate traffic behavior provided 450 may be traffic behavior data that belongs to the respective portion of the aggregate traffic source behavior data maintained at aggregation node 400 as may be determined by a distribution schema implemented among the nodes of the aggregation level. Although not illustrated, in some embodiments, aggregate traffic behavior data received an aggregation node that is not responsible for maintaining the data at the aggregation level may forward the aggregate traffic behavior data to the appropriate aggregation node in the aggregation level.

Once received, the aggregate traffic behavior data may be stored, in persistent storage, such as aggregate traffic behavior data 430. Various different types or formats of data stores may implemented, such as various online analytical processing (OLAP) or online transaction processing (OLTP) type data stores in order to aid the update and/or querying of data from aggregate traffic behavior data 430. Traffic analysis 410 may analyze the received aggregate traffic behavior data 450 according to a granularity specified for a next (or higher) aggregation level. This aggregate version of the data may be passed to traffic reporting 420 which may provide the aggregate traffic behavior to the next aggregation level 460. Traffic reporting 420 may identify according to a distribution schema for the next aggregation level, an aggregation node to send the aggregate version 460, in various embodiments.

Traffic behavior aggregation node 400 may, in various embodiments, implement a query engine 440 to receive queries 470 for traffic behavior data. The queries may include various predicates, or selection criteria, which query engine 440 may be able to evaluate in order to obtain the requested data. In at least some embodiments, query engine 440 may be configured to recognize queries for data for which insufficient granularity of the aggregate traffic behavior data exists at the current aggregation level. For instance, an error response might be returned for a request for endpoint specific traffic behavior data at an aggregation node in a higher aggregation level. Once the requested data is obtained from aggregate traffic behavior data 430, then a traffic behavior data response 480 may be sent. In some embodiments (not illustrated) query engine 440 may be configured to send a request to the appropriate node in the appropriate aggregation level (e.g., as described below with regard to FIG. 8).

Figure 5:
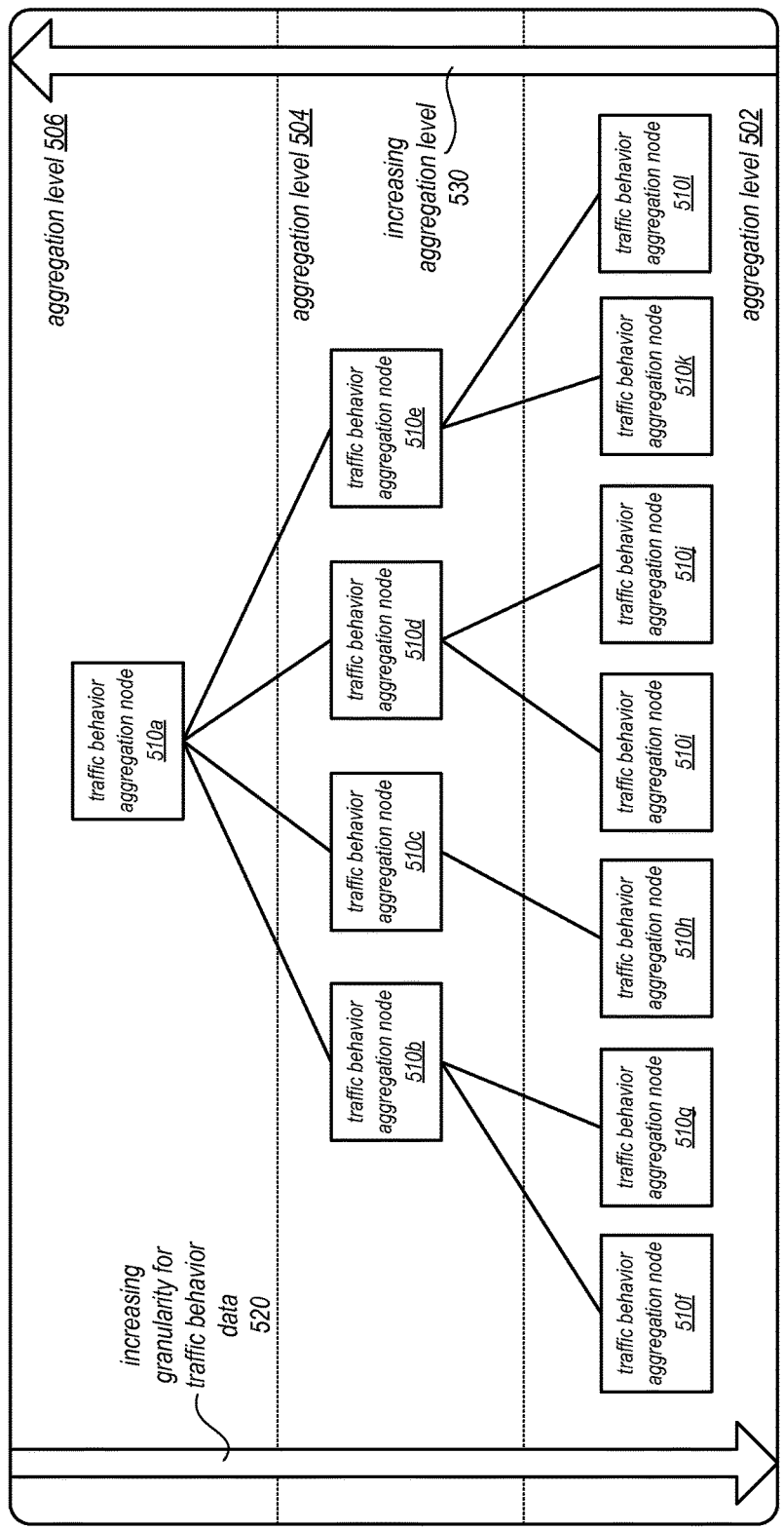
FIG. 5 is a block diagram illustrating different aggregation levels for maintaining aggregate traffic source behavior data, according to some embodiments.

FIG. 5 is a block diagram illustrating different aggregation levels for maintaining aggregate traffic source behavior data, according to some embodiments. As has been discussed previously, different aggregation levels may be implemented for aggregate traffic source behavior data, providing different views and the ability to tune responsive actions based on the behavior of different traffic sources (as viewed at different granularities). For a high level view, such as provided at traffic behavior aggregation node 510 in aggregation level 506, the increase in aggregation level 530 has led to a decrease in the amount of traffic source behavior that is significant enough to warrant universal inclusion for all network resources. As the arrow 520 indicates, the lower the aggregation level, the increased granularity for aggregated traffic source behavior data maintained in the aggregation level. Thus, aggregated traffic source behavior data maintained in aggregation level 504 (distributed among nodes 510*b*, 510*c*, 510*d*, and 510*e* according to a distribution schema) may include more or different types of data points, or other information regarding traffic source behavior than in aggregation level 506. Similarly, aggregated traffic source behavior data maintained in aggregation level 502 (distributed among nodes 510*f*, 510*g*, 510*h*, 510*i*, 510*j*, 510*k* and 510*l* according to a distribution schema, which may not be the same as in level 504) may include more data points, or other information regarding traffic source behavior than in aggregation level 504. The nodes 510 in the various aggregation levels may be implemented as one or more different clusters that provide various map-reduce like functions, and may be implemented according to various cluster technologies, such as Hadoop.

Figure 6:
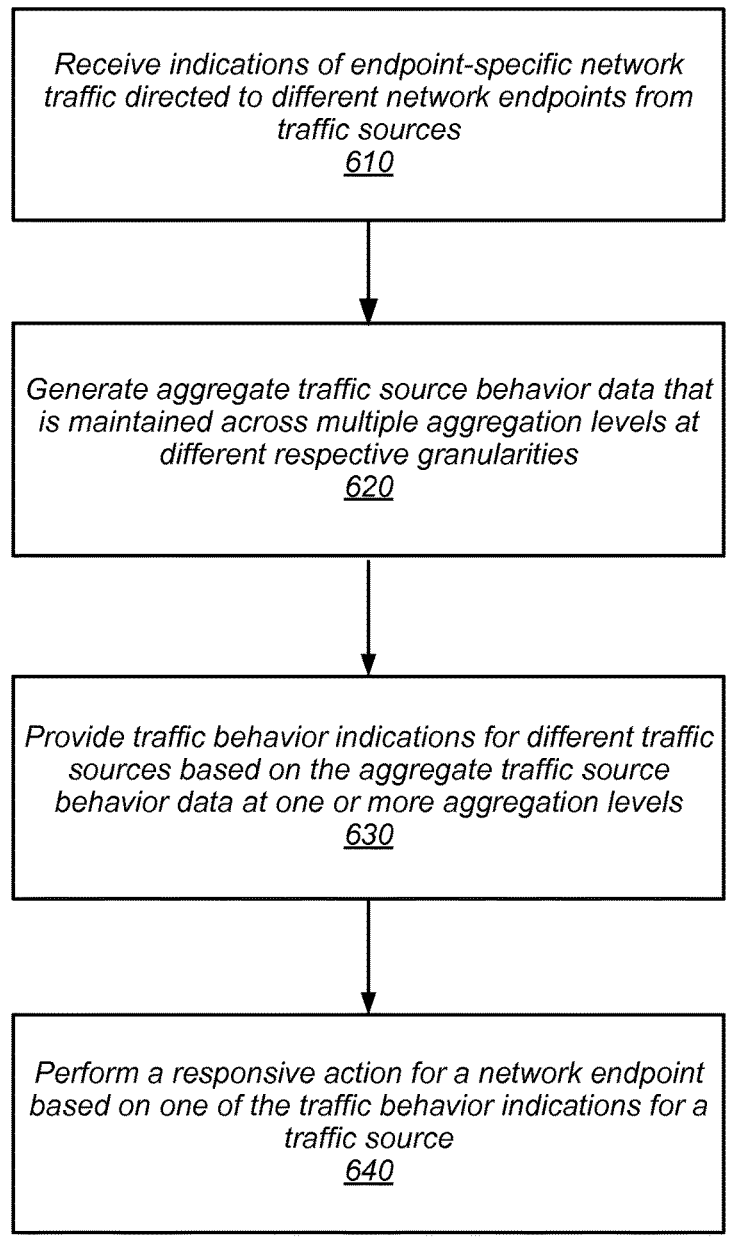
FIG. 6 is high-level flowchart illustrating various methods and techniques for aggregating network traffic source behavior data across network endpoints, according to some embodiments.

The examples of implementing aggregation of network traffic source behavior data across network endpoints discussed above with regard to FIGS. 2-5 have been given in regard to virtual computing resources (or other resources) offered by a provider network. Various other types or configurations of a provider network may implement these techniques, or other collections of network-based resources behind network endpoints. FIG. 6 is high-level flowchart illustrating various methods and techniques for aggregating network traffic source behavior data across network endpoints, according to some embodiments. These techniques may be implemented using various components of virtual computing resource provider as described above with regard to FIGS. 2-5 or other provider network components.

As indicated at 610, indications of endpoint-specific network traffic directed to different network endpoints may be received from traffic sources. Network traffic may be any form of message, request, or communication that initiates request processing at the network resource behind the network endpoint. Indications of the endpoint-specific network traffic may include metrics (e.g., requests per timeslice from traffic source X). Such data may be continually collected and received, in various embodiments. As indicated at 620, aggregate traffic source behavior data may be generated that is maintained across different aggregation levels at different respective granularities. As discussed above, each aggregation level may maintain a different view of the aggregate endpoint-specific network traffic. In at least some embodiments, different traffic aggregation nodes may be implemented for each aggregation level to maintain different respective portions of the aggregate traffic source behavior data at the granularity of the aggregation level to which the aggregation nodes are assigned.

Figure 7:
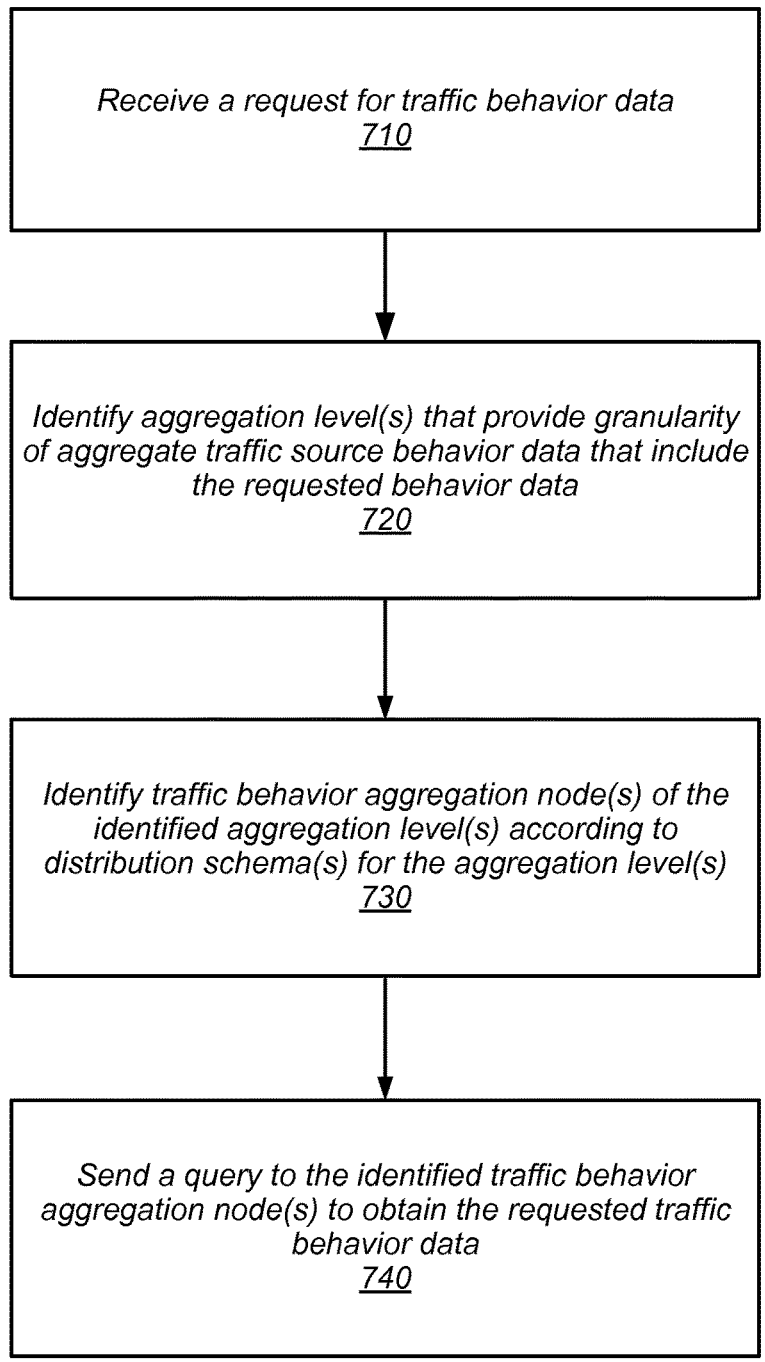
FIG. 7 is high-level flowchart illustrating various methods and techniques for obtaining traffic behavior data for traffic resources across different aggregation levels, according to some embodiments.
Figure 8:
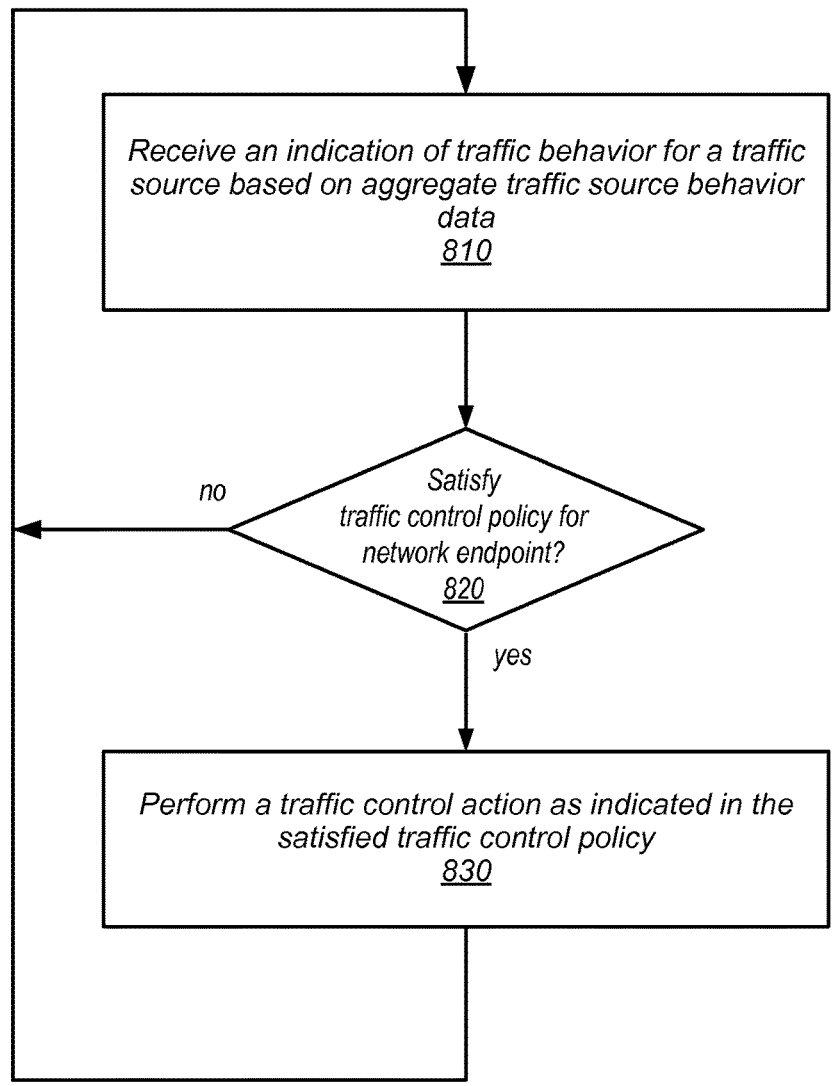
FIG. 8 is a high-level flowchart illustrating various methods and techniques for performing responsive actions based on aggregate traffic source behavior data, according to some embodiments.

As indicated at 630, in various embodiments, traffic behavior notification for different traffic sources may be provided that is based, at least in part, on the aggregate traffic source data at one or more aggregation levels. For example, traffic source behavior data that is specific to a particular network endpoint may be retrieved from an aggregation level that is low enough to maintain endpoint-specific aggregation (e.g., level 502 in FIG. 5). For other indications of traffic behavior, other aggregation levels may be accessed alone, or in combination, to provide the traffic behavior indications. FIG. 7, discussed below provides further discussion for techniques to obtain traffic source behavior data. As indicated at 640, in various embodiments, a responsive action may be performed for a network endpoint based on the traffic behavior indications for a traffic source. For example, if the indication describes that the rate of requests exceeds some threshold (e.g., 1,000 requests per 1 second), then a responsive action (e.g., dropping traffic from the traffic source) may be performed. FIG. 8 provides further discussion of performing responsive actions, in various embodiments.

FIG. 7 is high-level flowchart illustrating various methods and techniques for obtaining traffic behavior data for traffic resources across different aggregation levels, according to some embodiments. As indicated at 710, a request for traffic behavior data may be received, in various embodiments. The request for traffic data may include various selection criteria, predicates, or other indications of the desired traffic behavior data. For example, all traffic sources with a user agent value of ="XYZ" and a request rate of 200 requests per 1 second may be requested. Based on the request, aggregation level(s) that provide granularity of traffic source behavior data that include the requested behavior data (e.g., user agent values) may be identified, in various embodiments, as indicated at 720. For example, the aggregation policies for the different aggregation levels may be evaluated to determine whether one or more aggregation levels may provide the requested traffic behavior data.

As indicated at 730, traffic behavior aggregation node(s) of the identified aggregation level(s) may be identified, according to the distribution schema(s) for the aggregation level(s), in various embodiments. For example, if a hash mod function distributing traffic source identifiers (e.g., network address) is performed to distribute the data among 4 nodes, then the result of the hash mod function may indicate which node of a particular aggregation level to query for the traffic behavior data. As indicated at 740, a query may be sent to the identified traffic behavior aggregation node(s) to obtain the requested traffic behavior data, in various embodiments. For example, the query may be formatted according to a programmatic interface specific to aggregation nodes, or for a cross-endpoint traffic analysis service. In at least some embodiments, an initial request to a highest level aggregation node may instigate the performance of this technique or a similar technique to traverse the different nodes and aggregation levels to locate the requested data.

FIG. 8 is a high-level flowchart illustrating various methods and techniques for performing responsive actions based on aggregate traffic source behavior data, according to some embodiments. As indicated at 810, an indication of traffic behavior for a traffic source may be received that is based on aggregate traffic source behavior data 810. In at least some embodiments, the traffic source has not sent any network traffic to the network endpoint. If the indicated traffic behavior of the traffic source satisfies the traffic control policy for the network endpoint, as indicated at 820, then a traffic control action as indicated in the satisfied traffic control policy may be performed, in various embodiments. A traffic control policy (or other responsive action policy) may include various conditions, elements, predictes, or other requirements which may trigger the performance of a described responsive action. For example, if the traffic policy includes a condition of a number of page requests for a website performed within a particular time period, then satisfying the condition may trigger a traffic control action to redirect a request received from the traffic source to a page that requires a human user to enter information (e.g., a Completely Automated Public Turing test to tell Computers and Humans Apart (CAPTCHA)). Other responsive actions, such as blocking or dropping traffic from the traffic source may be performed. In at least some embodiments, traffic from the identified source may be allowed, but recorded.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the virtual computing resource provider described herein). The various methods as illustrated in the figures and described herein represent example embodiments of methods. The order of any method may be changed, and various elements may be added, reordered, combined, omitted, modified, etc.

Embodiments of aggregating network traffic source behavior data across network endpoints as described herein may be executed on one or more computer systems, which may interact with various other devices. FIG. 9 is a block diagram illustrating an example computer system, according to various embodiments. For example, computer system 1000 may be configured to implement nodes of a cross-endpoint traffic analysis service, provider network, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network and/or cross-endpoint traffic analysis service, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A network traffic analysis system, comprising:
   a plurality of traffic behavior aggregation nodes that implement a plurality of different aggregation levels for traffic source behavior data for a network traffic analysis system, the plurality of traffic behavior aggregation nodes implemented via one or more computers comprising one or more hardware processors and configured to:
   receive respective indications of endpoint-specific network traffic directed to different ones of a plurality of network endpoints from a plurality of traffic sources;
   based, at least in part, on the respective indications of the endpoint-specific network traffic from the plurality of traffic sources, generate aggregate traffic source behavior data that is maintained across the plurality of different aggregation levels, wherein a different respective granularity of the aggregate traffic source behavior data is maintained at the plurality of different aggregation levels, wherein the plurality of traffic behavior aggregation nodes maintain different respective portions of the aggregate traffic source behavior data according to the different respective granularity of the plurality of different aggregation levels;
   a control plane for the network traffic analysis system, configured to:
   identify traffic behavior for a particular traffic source of the plurality of traffic sources based, at least in part, on the aggregate traffic source behavior data at one or more of the plurality of different aggregation levels, wherein to identify the traffic behavior for the particular traffic source of the plurality of traffic sources, the control plane is configured to:
   in response to a received request for traffic behavior data:
   identify one or more aggregation levels that provide a respective granularity of the aggregate traffic source behavior data that includes the requested traffic behavior data;
   identify at least one of the one or more traffic behavior aggregation nodes of the identified one or more aggregation levels to query for the traffic behavior data; and
   send a query to the identified at least one traffic behavior aggregation node to obtain the traffic behavior data; and
   provide an indication of the identified traffic behavior of the particular traffic source such that a traffic control action is performed with regard to the particular traffic source for one or more network endpoints of the plurality of endpoints, wherein the particular traffic source did not direct endpoint-specific network traffic to at least one of the one or more network endpoints.

2. The system of claim 1, wherein to generate the aggregate traffic source behavior data, at least one of the plurality of traffic behavior aggregation nodes is configured to:
   receive traffic source behavior data according to the respective granularity for a particular aggregation level for the at least one traffic behavior aggregation node from another one of the plurality of traffic behavior aggregation nodes;
   analyze the traffic source behavior data according to the respective granularity for another aggregation level that is different than the particular aggregation level; and
   based, at least in part, on the analysis of the traffic source behavior data, send an aggregated version of the traffic source behavior data to a traffic behavior aggregation node that maintains a respective portion of the aggregate traffic source behavior data as part of the other aggregation level.

3. The system of claim 1, wherein the network traffic analysis system is implemented as part of a provider network, wherein the provider network implements one or more network-based services, wherein the plurality of network endpoints receive network traffic for different resources implemented at the one or more network-based services of the provider network.

4. The system of claim 3, wherein the one or more network-based services of the provider network is a virtual computing service, wherein the different resources are implemented at a plurality of virtual computing hosts for the virtual computing service, and wherein the virtual computing hosts for the resources of the one or more network endpoints perform the traffic control action in response to a determination that the indicated behavior of the particular traffic source violates respective traffic control policies for the resources.

5. A method, comprising:
performing, by one or more computing devices comprising one or more hardware processors:
receiving respective indications of endpoint-specific network traffic directed to different ones of a plurality of network endpoints from a plurality of traffic sources;
based, at least in part, on the respective indications of the endpoint-specific network traffic from the plurality of traffic sources, generating aggregate traffic source behavior data that is maintained across a plurality of different aggregation levels, wherein a different respective granularity of the aggregate traffic source behavior data is maintained at the plurality of different aggregation levels, wherein the plurality of different aggregation levels respectively comprise one or more traffic behavior aggregation nodes that maintain different portions of the aggregate traffic source behavior data according to the respective granularity of the aggregation level; and
based, at least in part, on the aggregate traffic source behavior data at one or more of the plurality of different aggregation levels, providing a traffic behavior indication for one or more traffic sources of the plurality of traffic sources such that a responsive action is performed with regard to at least one of the one or more traffic sources for one or more network endpoints of the plurality of endpoints, wherein providing the traffic behavior indication for the one or more traffic sources of the plurality of traffic sources comprises:
in response to receiving a request for traffic behavior data:
identifying one or more aggregation levels that provide a respective granularity of the aggregate traffic source behavior data that includes the requested traffic behavior data;
identifying at least one of the one or more traffic behavior aggregation nodes of the identified one or more aggregation levels to query for the traffic behavior data; and
sending a query to the identified at least one traffic behavior aggregation nodes to obtain the traffic behavior data.

6. The method of claim 5, wherein providing the traffic behavior indication for the one or more traffic sources of the plurality of traffic sources further comprises:
in response to receiving the request for traffic behavior data:
identifying the at least one of the one or more traffic behavior aggregation nodes of the identified one or more aggregation levels to query for the traffic behavior data according to a respective distribution schema for portions of the aggregate traffic source behavior data maintained at the identified one or more aggregation levels;
and
wherein the traffic behavior indication for the one or more traffic sources is based, at least in part, on the obtained traffic behavior data in a response to the query.

7. The method of claim 6, wherein the request for traffic behavior data pertains to network traffic directed to a particular network endpoint of the plurality of endpoints.

8. The method of claim 5, wherein the one or more computing devices implement a network traffic analysis system for a provider network, wherein the provider network implements one or more network-based services, wherein at least some of the plurality of network endpoints receive network traffic for different resources implemented at the one or more network-based services of the provider network.

9. The method of claim 8, wherein at least one of the one or more network endpoints that is provided with the traffic behavior indication for the one or more traffic sources receives network traffic for a resource that is external to the provider network.

10. The method of claim 5, wherein at least some other ones of the plurality of network endpoints receive network traffic for different resources that are external to the provider network.

11. The method of claim 5, wherein providing the traffic behavior indication for the one or more traffic sources comprises publishing the traffic behavior indication for the one or more traffic sources to a location for consumption by respective network traffic agents for the plurality of network endpoints.

12. The method of claim 5, wherein the responsive action performed with regard to the at least one traffic source initiates a different process for handling network traffic from the at least one traffic source.

13. The method of claim 5, wherein the generating aggregate traffic source behavior data comprises forwarding traffic behavior data from an aggregation node of a particular aggregation level to another aggregation node of the same aggregation level of the plurality of different aggregation levels.

14. A non-transitory, computer-readable storage medium, storing program instructions that when executed by one or more computing devices cause the one or more computing devices to implement:
receiving respective indications of endpoint-specific network traffic directed to different ones of a plurality of network endpoints from a plurality of traffic sources;
based, at least in part, on the respective indications of the endpoint-specific network traffic from the plurality of traffic sources, generating aggregate traffic source behavior data that is maintained across a plurality of different aggregation levels, wherein a different respective granularity of the aggregate traffic source behavior data is maintained at the plurality of different aggregation levels, wherein the plurality of different aggregation levels respectively comprise one or more traffic behavior aggregation nodes that maintain different portions of the aggregate traffic source behavior data according to the respective granularity of the aggregation level; and
based, at least in part, on the aggregate traffic source behavior data at one or more of the plurality of different aggregation levels, providing a traffic behavior indication for one or more traffic sources of the plurality of traffic sources such that a traffic control action is performed with regard to at least one of the one or more traffic sources for one or more network endpoints of the plurality of endpoints, wherein the at least one traffic source did not direct endpoint-specific network traffic to at least one of the one or more network endpoints, and wherein providing the traffic behavior indication for the one or more traffic sources of the plurality of traffic sources comprises:

in response to receiving a request for traffic behavior data:
  identifying one or more aggregation levels that provide a respective granularity of the aggregate traffic source behavior data that includes the requested traffic behavior data;
  identifying at least one of the one or more traffic behavior aggregation nodes of the identified one or more aggregation levels to query for the traffic behavior data; and
  sending a query to the identified at least one traffic behavior aggregation nodes to obtain the traffic behavior data.

15. The non-transitory, computer-readable storage medium of claim 14, wherein, in generating aggregate traffic source behavior data that is maintained across a plurality of different aggregation levels, the program instructions cause the one or more computing devices to implement:
for each of different ones of the plurality of traffic behavior aggregation nodes:
  receiving, at the traffic behavior aggregation node, traffic source behavior data according to the respective granularity for a particular aggregation level for the traffic behavior aggregation node from another one of the plurality of traffic behavior aggregation nodes;
  analyzing, at the traffic behavior aggregation node, the traffic source behavior data according to the respective granularity for another aggregation level that is different than the particular aggregation level; and
  based, at least in part, on the analyzing of the traffic source behavior data, sending an aggregated version of the traffic source behavior data to a traffic behavior aggregation node that maintains a respective portion of the aggregate traffic source behavior data as part of the other aggregation level.

16. The non-transitory, computer-readable storage medium of claim 14, wherein, in providing the traffic behavior indication for the one or more traffic sources of the plurality of traffic sources, the program instructions cause the one or more computing devices to implement:
in response to receiving the request for traffic behavior data:
  identifying the at least one of the one or more traffic behavior aggregation nodes of the identified one or more aggregation levels to query for the traffic behavior data according to a respective distribution schema for portions of the aggregate traffic source behavior data maintained at the identified one or more aggregation levels;
  wherein the traffic behavior indication for the one or more traffic sources is based, at least in part, on the obtained traffic behavior data in a response to the query.

17. The non-transitory, computer-readable storage medium of claim 14, wherein the one or more computing devices implement a network traffic analysis system for a provider network, wherein the provider network implements one or more network-based services, wherein at least some of the plurality of network endpoints receive network traffic for different resources implemented at the one or more network-based services of the provider network.

18. The non-transitory, computer-readable storage medium of claim 17, wherein at least one of the one or more network endpoints that is provided with the traffic behavior indication for the one or more traffic sources receives network traffic for a resource that is external to the provider network.

19. The non-transitory, computer-readable storage medium of claim 17, wherein the one or more network-based services of the provider network is a virtual computing service, wherein the different resources are implemented at a plurality of virtual computing hosts for the virtual computing service, and wherein the virtual computing hosts for the resources of the one or more network endpoints perform the traffic control action in response to a determination that the indicated behavior of the particular traffic source violates respective traffic control policies for the resources.

20. The non-transitory, computer-readable storage medium of claim 14, wherein the responsive action performed with regard to the at least one traffic source blocks subsequent network traffic from the at least one traffic source to the one or more network endpoints.

\* \* \* \* \*